United States Patent
Olper et al.

(10) Patent No.: US 7,604,785 B2
(45) Date of Patent: Oct. 20, 2009

(54) PROCESS FOR THE RECOVERY OF ELEMENTAL SULPHUR FROM RESIDUES PRODUCED IN HYDROMETALLURGICAL PROCESSES

(75) Inventors: Marco Olper, Monza Milan (IT); Massimo Maccagni, Sesto San Giovanni Milan (IT); Silvano Cossali, Ponte Nossa Bergamo (IT)

(73) Assignee: Engitec Technologies S.p.A., Milan (IT)

( * ) Notice: Subject to any disclaimer, the term of this patent is extended or adjusted under 35 U.S.C. 154(b) by 177 days.

(21) Appl. No.: 11/805,181

(22) Filed: May 22, 2007

(65) Prior Publication Data

US 2007/0274902 A1    Nov. 29, 2007

(30) Foreign Application Priority Data

May 26, 2006   (IT)   .......................... MI2006A1033

(51) Int. Cl.
*C01B 17/02* (2006.01)
*C01B 17/06* (2006.01)
(52) U.S. Cl. .................. 423/98; 423/431; 423/438; 423/562; 423/566.2; 423/571; 423/637
(58) Field of Classification Search .................. 423/98, 423/431, 438, 562, 566.2, 571, 637
See application file for complete search history.

(56) References Cited

U.S. PATENT DOCUMENTS

| 2,329,816 A | * | 9/1943 | Betterton et al. ............. 205/613 |
| 3,933,475 A | * | 1/1976 | Swanson ..................... 75/419 |
| 4,138,248 A | | 2/1979 | Narain |
| 5,630,931 A | * | 5/1997 | Manequini ................... 205/600 |
| 6,696,037 B1 | | 2/2004 | Watanabe et al. |

FOREIGN PATENT DOCUMENTS

SU    1806086 A3    3/1993

OTHER PUBLICATIONS

European Search Report, Sep. 6, 2007.

* cited by examiner

*Primary Examiner*—Timothy C Vanoy
(74) *Attorney, Agent, or Firm*—James V Costigan; Hedman & Costigan, P.C.

(57) ABSTRACT

The present invention relates to a process for the recovery of elemental sulphur from residues produced in hydrometallurgical processes based on leaching with a solution of sodium sulphide in which the sulphur contained in the residues is selectively leached as sodium polysulphide. The sulphur leaching solution is conveniently regenerated and recycled to the process.

12 Claims, 1 Drawing Sheet

PROCESS FOR THE RECOVERY OF ELEMENTAL SULPHUR FROM RESIDUES PRODUCED IN HYDROMETALLURGICAL PROCESSES

The present invention relates to a process for the recovery of elemental sulphur from residues produced in hydrometallurgical processes.

The present invention derives from the field of desulphurization processes of the residues of the metallurgical industry.

Hydrometallurgical processes for the production of metals from concentrates based on sulphides lead to the production of elemental sulphur which is generally found in a mixture with gangue and other insoluble products.

These residues can also contain precious metals, and also other metals of industrial interest, in significant quantities. Their recovery however requires the removal of elemental sulphur and its recovery in pure form.

Various processes and methods for the recovery of sulphur from residual materials of hydrometallurgical processing are known, which avail of different types of recovery techniques such as flotation, filtration of molten sulphur, leaching with solvents miscible with water or with solvents immiscible with water, conversion to fertilizers and roasting.

Flotation is among these processes of the known art. This technology is used in the concentration of sulphide-based minerals based on the addition of foaming additives which preferably suspend some of the sulphurized compounds bringing them to the foam phase followed by skimming and recovery. Although many attempts have been made for the flotation of sulphur from these residues, the results are disappointing mainly due to the high quantity of other elements contained in the concentrated sulphur phase. Although this process for the recovery of sulphur is not particularly effective, it is an inexpensive method.

The process with filtration of molten sulphur is based on the principle that sulphur melts at a low temperature producing a hot dispersion which can be filtered. This process also obtains a rather low sulphur recovery even if the quality is discreet. Although this treatment is quite economical with respect to the operating costs, it requires, however, the use of sophisticated equipment.

With respect to recovery processes which avail of the use of solvents miscible in water, the use of Carbitol (2(2-ethoxyethoxy)ethanol) has been evaluated, but this so far has not given encouraging results as the water, containing in the residue, diminishes the solubility of the sulphur requiring the use of an evaporation unit.

The use of solvents immiscible in water for the recovery of sulphur has been indicated in numerous scientific publications. In particular, the use is described of perchloroethylene which exploits the great difference in solubility of sulphur with different temperatures (25 g/l at 25° C.-about 300 g/l at 120° C.). This process, however, also has its disadvantages of use, mainly due to the formation of greasy deposits (to be treated and/or disposed of) at the interface between the water extracted from the residue and solvent, to the toxicity of the solvent (classified as a carcinogenic substance) and, in addition, to the formation of crusts of sulphur on the cold surfaces of the exchangers.

As sulphur is soluble in sulphides, recovery techniques are also known which avail of the use of ammonium sulphide. The sulphur is leached as polysulphide and is then either transformed into ammonium sulphate or distilled in a vapour stream to give ammonium sulphide, which can then be recycled to the leaching, and sulphur which can be recovered in a substantially pure form. One of the main drawbacks of this technology lies in the fact that each unit must in any case by effectively sealed as on heating ammonium sulphide, which is an extremely unstable substance, there is an emission of ammonia and hydrogen sulphide.

Another sulphur recovery technology consists in roasting in which sulphur is transformed into sulphur dioxide which can in turn be converted to sulphuric acid and/or gypsum using suitable equipment.

The necessity is felt in the present state of the art for a process for the recovery of elemental sulphur from leaching residues of sulphide-based metallic concentrates or other materials which is substantially free of the drawbacks of the known art described above.

One of the objectives of the present invention therefore consists in providing a process for the recovery of elemental sulphur from residues produced in hydrometallurgical processes which is simple to effect and which allows the recovery and recycling of the reagents used.

Another objective of the present invention consists in providing a process which allows the recovery of elemental sulphur from residues produced in hydrometallurgical processes which is economically advantageous.

Figure 1:
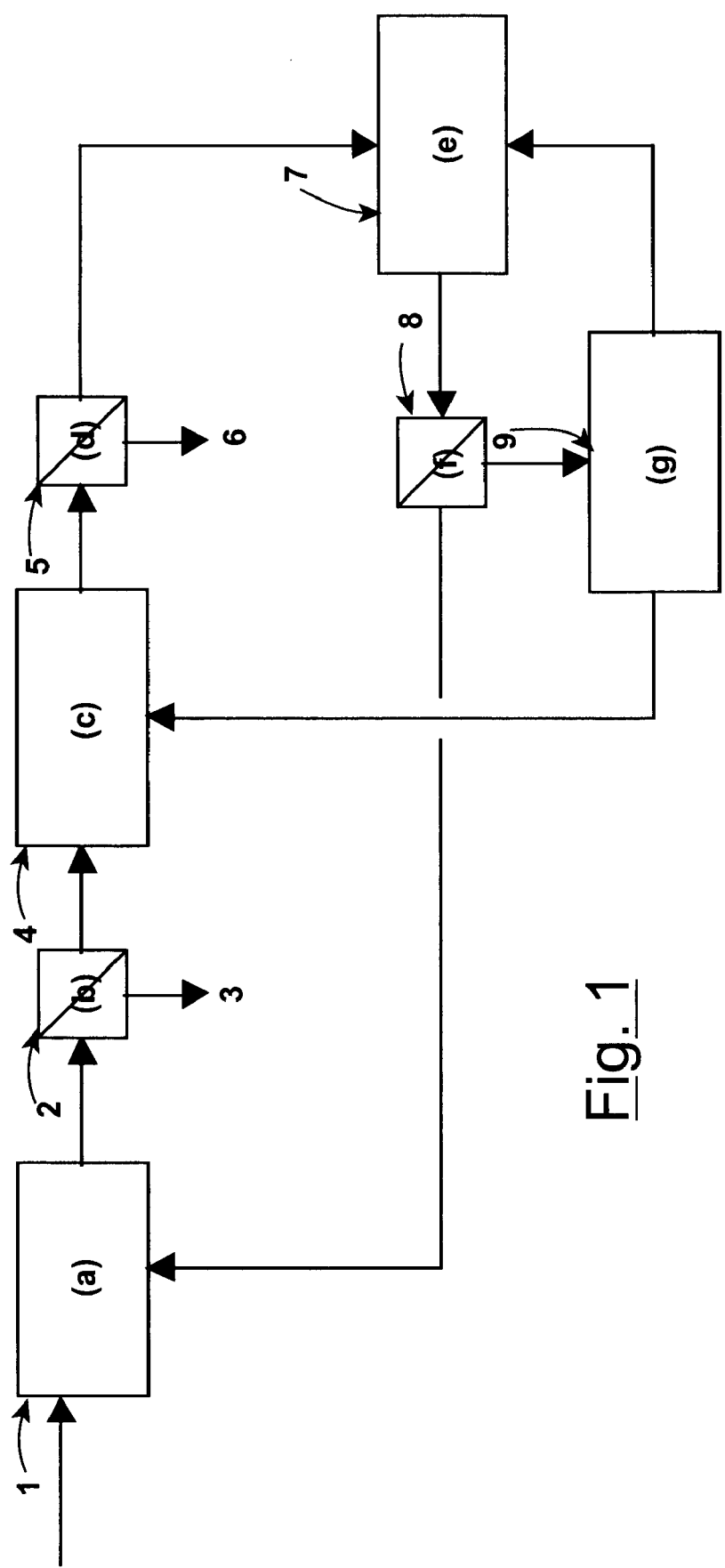
FIG. 1 is a flow diagram of the process of the invention.

These objectives are achieved by providing a process for the recovery of elemental sulphur from residues produced in hydrometallurgical processes as specified in the enclosed claim 1.

Further characteristics and embodiments of the invention are indicated in the subsequent dependent claims.

According to a first aspect, the process for the recovery of elemental sulphur from residues produced in hydrometallurgical processes comprises:

a) leaching of a residue containing sulphur with a solution of sodium sulphide;

b) separation, conveniently by filtration, of a residue from a solution of polysulphide;

c) treatment of said solution of polysulphide with $CO_2$ to give a dispersion containing elemental sulphur, polysulphide and sodium bicarbonate;

d) separation and recovery of the elemental sulphur contained in the dispersion from a solution containing polysulphide and sodium bicarbonate, and subsequently, optionally, e) treatment of said solution of polysulphide and sodium bicarbonate with CaO;

f) separation, conveniently by filtration, of a residue of $CaCO_3$ from a solution of sodium sulphide which is conveniently recirculated to phase a) of the process.

According to another embodiment, the process also comprises a phase g) for roasting the $CaCO_3$ residue, obtained in phase e) to produce:

CaO (lime), which can be used/recycled as reagent in phase e) of the process $CO_2$, which can be used/recycled as reagent in phase c) of the process.

According to an embodiment, the leaching phase a) is carried out inside a reactor at a temperature within the range of 20 to 100° C. and typically about 80° C., for a period of time ranging from 10 to 120 minutes and preferably for about 30 minutes. According to an embodiment, said leaching solution has a concentration of sodium sulphide ranging from 20 to 300 g/l, preferably equal to about 60 g/l. According to another embodiment, a residue which is substantially free of elemental sulphur is obtained in phase b), by filtration, together with a solution of polysulphide wherein (1+x+y) varies from 1 to 9 and is preferably equal to 5 and wherein (1+x) varies from 1 to 4 and is preferably equal to 2.

According to another embodiment of the process, phase d) for the treatment of the solution of polysulphide and bicarbonate with CaO is carried out inside a stirred reactor, at a temperature within the range of 20 to 100° C. and preferably equal to about 70° C. for a period of time ranging from 10 to 120 minutes and preferably equal to about 20 minutes.

The characteristics and advantages of an embodiment of a process for the recovery of elemental sulphur from residues according to the present invention will appear more evident from the following illustrative and non-limiting description, referring to the enclosed schematic drawing.

FIG. 1 illustrates a flow chart relating to an embodiment of the process of the invention which initially comprises the feeding of a reactor 1 with residues $(x+y)S°_{(Residue)}$ coming from the leaching of a lead concentrate.

The leaching phase a) takes place inside the reactor 1, which is preferably equipped with stirring means, with a solution of sodium sulphide in which the sulphur contained in the residues is selectively leached as sodium polysulphide (2) according to the following reaction:

$$Na_2S + (x+y)S°_{(Residue)} \rightarrow Na_2S_{(1+x+y)}$$

The dispersion obtained from the leaching phase is subsequently subjected to filtration using a filter which allows a good washing of the panel 2 and which allows a solution to be separated from an almost sulphur-free residue which is removed, to be typically subjected to subsequent flotation or treatment to extract the precious metals possibly present therein.

The solution recovered from the filtration phase b) of the process is transferred to a closed reactor 4 where it is then neutralized or treated according to phase c) of the process with carbon dioxide according to the following reaction:

$$Na_2S_{(1+x+y)} + CO_2 + H_2O \rightarrow NaHS_{(1+x)} + NaHCO_3 + yS°_{(S)}$$

The final dispersion obtained from this reaction is sent to a filter 5 where a sulphur residue (cake) is separated and removed (6) from a solution containing a mixture of bicarbonate and acid sodium polysulphide. This solution can regenerate a solution of sodium polysulphide. This regeneration is effected inside a reactor 7 by the addition of lime with the development of the following reaction:

$$NaHS_{(1+x)} + NaHCO_3 + CaO \rightarrow CaCO_3 + Na_2S_{(1+x)} + H_2O$$

The dispersion obtained is transferred to a filter 8 in which limestone ($CaCO_3$) is separated from the solution based on sodium polysulphide which is conveniently recycled to the leaching phase a) of the process.

In particular, for high-capacity plants, it is conveniently possible to recover lime (CaO) and carbon dioxide ($CO_2$) by typically roasting the limestone ($CaCO_3$) obtained inside a reactor or oven 9 according to the following reaction:

$$CaCO_3 \rightarrow CaO + CO_2$$

The lime recovered is conveniently subsequently sent to the reactor 7.

The overall reaction, also recovering CaO (10) and $CO_2$ (11), can be schematized as follows:

$$S°(Residue) \rightarrow S° (Pure\ solid)$$

In this case, the sulphur is recovered as elemental sulphur with a minimum consumption of reagents and with a considerable advantage in economical terms.

The process of the invention allows both the recovery and recycling of CaO and also the regeneration of a solution of sodium polysulphide which is conveniently recycled to the leaching section where the leaching reaction, from the second round onwards, becomes:

$$Na_2S_{(1+x)+yS°(Residue)} \rightarrow Na_2S_{(1+x+y)}$$

whereas reaction (1) is still valid for the make-up $Na_2S$.

The following examples are provided for purely illustrative purposes of the present invention and should not be considered as limiting the protection scope, as defined by the enclosed claims.

EXAMPLE 1

A residue produced from the leaching of a lead concentrate has a content of elemental sulphur of 52%. 100 g of this residue are introduced into a reactor containing 0.85 l of a 60 g/l solution of sodium sulphide ($Na_2S$). After 1 h of leaching at 55° C., 46.85 g of dry residue washed residue are obtained, which contains 0.08 g of residual elemental sulphur and 1.0 l of a solution of sodium polysulphide ($Na_2S_x$ wherein X is about 3.5) including the washing of the cake.

The solution is introduced into a closed reactor where approximately 43 g of $CO_2$ are fed. The dispersion produced is filtered, the cake washed and dried recovering 30.96 g of pure sulphur. Part of the sulphur is still in the aqueous phase as polysulphide.

The filtrate is treated with 55 g of lime (CaO) obtaining a dispersion which is filtered recovering 97.45 g of dry washed residue ($CaCO_3$) and 1.46 l of a solution containing about 49.6 g/l of sodium polysulphide (approximately $Na_2S_2$) to be recycled to the leaching.

EXAMPLE 2

Another portion of residue coming from the leaching of a lead concentrate, already used in Example 1, is adopted for this test and the end-solution of Example 1 evaporated to 0.85 l, is used as leaching solution. 60 g of residue are introduced into a reactor into which the regenerated solution of polysulphide is fed.

After 1 h of leaching at 55° C., 28.11 g of dry residue washed residue are obtained, which contains 0.06 g of residual elemental sulphur and 0.96 l of a solution of sodium polysulphide ($Na_2S_x$ wherein X is about 3.5) including the washing of the cake.

The solution is introduced into a closed reactor where approximately 43 g of $CO_2$ are fed. The dispersion produced is filtered, the cake washed and dried recovering 31.39 g of pure sulphur.

The filtrate is treated with 55 g of lime (CaO) obtaining a dispersion which is filtered recovering 97.22 g of dry washed residue ($CaCO_3$) and 1.38 l of a solution containing about 55.2 g/l of sodium polysulphide (approximately $Na_2S_2$) to be recycled to the leaching.

The invention claimed is:

1. A process for the production of elemental sulphur from residues produced in hydrometallurgical processes comprises:
    a) leaching of residues containing sulphur with a solution of sodium sulphide wherein the sulphur contained in said residues is selectively leached as sodium polysulphide;
    b) separation of the residues from the solution containing polysulphide;

c) treatment of said solution containing polysulphide with $CO_2$ to obtain a dispersion containing elemental sulphur, acid sodium polysulphide and sodium bicarbonate;

d) separation and recovery of the elemental sulphur from the solution containing acid sodium polysuiphide and sodium bicarbonate;

e) treatment of said solution of acid sodium polysulphide and sodium bicarbonate with CaO for regenerating the leaching solution;

f) separation of a residue of $CaCO_3$ from a solution of sodium sulphide which is recirculated to phase a) of the process.

2. The process according to claim 1 comprising a further phase g) for the roasting of the $CaCO_3$ residue obtained in phase e) to produce CaO and $Co_2$.

3. The process according to claim 2, wherein the CaO obtained from said phase g) is recycled to phase e) of the process and the $Co_2$ obtained is recycled to said phase c).

4. The process according to claim 1, wherein the solution of sodium sulphide of the leaching phase a) has a concentration ranging from 20 to 300 g/l.

5. The process according to claim 1, wherein the leaching phase a) is carried out at a temperature ranging from 20 to 100° C. for a period of time ranging from 10 to 120 minutes.

6. The process according to claim 1, wherein the leaching phase a) is carried out in a stirred reactor.

7. The process according to claim 1, wherein the separation phases b), f) are effected by filtration.

8. The process according to claim 1, wherein said phase e) for treatment with CaO is carried out at a temperature ranging from 20 to 100° C. for a period of time ranging from 10 to 120 minutes.

9. The process according to claim 1, wherein said phase e) for treatment with CaO is carried out in a stirred reactor.

10. The process according to claim 1, wherein the residue separated in phase b) is substantially free of sulphur and is subjected to flotation or treatment for the extraction of the metals present therein.

11. The process according to claim 1, wherein the leaching phase a) is carried out in a stirred reactor.

12. The process according to claim 1, wherein the residues to be treated are produced from the leaching of a lead concentrate.

* * * * *